UNITED STATES PATENT OFFICE.

HENRY G. TYER AND JOHN HELM, OF NEW BRUNSWICK, NEW JERSEY.

IMPROVEMENT IN PROCESSES OF MAKING INDIA-RUBBER CLOTH.

Specification forming part of Letters Patent No. 12,144, dated January 2, 1855.

*To all whom it may concern:*

Be it known that we, HENRY G. TYER and JOHN HELM, of New Brunswick, in the State of New Jersey, have invented new and useful improvements in preparing the upper stuff for boots and shoes, whereby it is rendered capable of resisting the admission of water, but allowing the escape of air through it, being thus both ventilated and water-proof, of which the following is a specification.

To enable others skilled in the art to employ our said invention, we give the following description.

We take cotton, linen, or silk cloth, or such other and of such fineness or coarseness as fashion or convenience may require for uppers for shoes and boots, and coat it with a thin layer of india-rubber cement of ordinary consistence for spreading, (mixed, say, in proportions of twelve gallons of camphene to thirty pounds of rubber;) and for this purpose a brush may be used, but we prefer a machine well known in the trade as "McIntosh's gage or scraping-machine." After the goods are so coated they must be suddenly subjected to a degree of heat ranging from 140° to 180° Fahrenheit. The goods may be brought in connection with such degree of heat either by thrusting them suddenly into an oven or other apartment previously raised to such temperature, only passing them rapidly over or around a drying or evaporating drum previously raised to the required temperature. By this sudden application of a high degree of heat after the goods are spread, as above stated, and while they are in a green undried state, the camphene used in the cement evaporates with great rapidity, and by its instantaneous escape or separation from and through the gum it punctures it and leaves it punctured by minute orifices throughout its entire surface so subjected to the heat, which orifices are too small to allow the passage of globules of water through them, but are large enough and numerous enough to allow a free passage through them to atmospheric air.

Boots and shoes made of this article are superior to and better preserve health to the wearer than any other known water-proof boot or shoe. They prevent the foot from becoming damp or wet by perspiration by allowing a circulation of air, and at the same time prevent its being wet by water by resisting the penetration of the water. The article thus possesses the quality of attaining all the advantages and of escaping all the disadvantages of punctures or holes through the uppers of boots and shoes, and it may also be applied to other uses.

Having thus described our invention, what we claim, and desire to secure by Letters Patent, is—

The peculiar mode, so described, of preparing the uppers of boots and shoes.

HENRY G. TYER.
     JOHN HELM.

Witnesses:
 JOHN VAN DYKE,
 ELIAS I. THOMPSON.